United States Patent [19]

Sollich

[11] 4,178,105

[45] Dec. 11, 1979

[54] APPARATUS FOR CONTROLLING THE TEMPERATURE OF FLOWABLE CHOCOLATE MATERIALS

[75] Inventor: Helmut Sollich, Kalletal, Fed. Rep. of Germany

[73] Assignee: Sollich KG Spezialmaschinenfabrik, Bad Salzuflen, Fed. Rep. of Germany

[21] Appl. No.: 910,852

[22] Filed: May 30, 1978

[30] Foreign Application Priority Data

Jun. 3, 1977 [DE] Fed. Rep. of Germany ....... 2725183

[51] Int. Cl.² .......................... B01F 7/16; A23C 3/04
[52] U.S. Cl. ...................................... 366/312; 99/455
[58] Field of Search ................. 99/455; 366/67, 163, 366/309, 312, 313

[56] References Cited

U.S. PATENT DOCUMENTS

| | | | |
|---|---|---|---|
| 2,021,153 | 11/1935 | Sawyer | 366/312 |
| 2,589,350 | 3/1952 | Edmunds | 366/312 X |
| 3,601,371 | 8/1971 | Ross | 366/312 |
| 3,752,057 | 8/1973 | Gross | 366/312 |
| 4,059,047 | 11/1977 | Sollich | 99/455 |

*Primary Examiner*—Edward J. McCarthy
*Attorney, Agent, or Firm*—Scully, Scott, Murphy & Presser

[57] ABSTRACT

An apparatus for the temperature control of flowable chocolate, such apparatus comprising a rotor rotating in a temperature-controlled housing and having means which bear resiliently against the housing and which wipe the chocolate away from the housing during rotation of the rotor.

6 Claims, 2 Drawing Figures

APPARATUS FOR CONTROLLING THE TEMPERATURE OF FLOWABLE CHOCOLATE MATERIALS

BACKGROUND OF THE INVENTION

1. Field of the Invention

The present invention relates to an apparatus for controlling the temperature of fat-containing materials, such as flowable chocolate or the like.

In order to impart a specific structure to chocolate materials having the smallest possible and regularly distributed crystals, it is known to control the temperature thereof to bring it into a viscous flowable state and to mix it by means of agitators. For this purpose it is known to carry out the temperature control or tempering in a cylindrical annular chamber between a rotor housing and a rotor rotating therein. The rotor housing is temperature-controlled so that the chocolate is in a viscously flowable state. In this manner, the crystals thus achieve their desired mini-structure. Through the rotation of the rotor the chocolate is caused to be thoroughly mixed, uniform distribution of the miniaturized crystals being achieved thereby.

In this process the chocolate must be prevented from being deposited on the inner wall of the rotor housing. If this were not to be counteracted, the inner wall of the rotor housing would rapidly become coated with a cohesive layer of chocolate. This would prevent the transfer of heat between the rotor housing and the chocolate material exteriorly of the layer adjoining the inner wall of the rotor housing, with the result that the cooling capacity would have to be increased in an attempt to discharge sufficient heat through the layer of adhering chocolate and out of the chocolate material to the outside of the layer, and this would impair the economy of the process. On the other hand, the chocolate of the adhering layer and the other chocolate material would not be admixed, and it is precisely this step which must be afforded according to the object of the process, because uniform distribution of minimum sized crystals must be achieved by the mixing operation. Finally, if the chocolate were to be subjected to too low a temperature for a long period, the crystals in the layer adhering to the inside of the housing would be stimulated into continual growth. The required minicrystals can be obtained only by means of a specific temperature acting over a specific period. An ordinary rotor rotating in a housing would therefore provide uniform distribution of minimum sized crystals in respect of the chocolate situated in the cylindrical annular chamber between the rotor and the housing, but these crystals would not be uniform.

2. Discussion of the Prior Art

In recognition of this drawback it is already known to provide the rotor with scrapers which are resiliently pressed against the inside of the rotor housing and continuously scrape the chocolate from the housing wall while the rotor rotates. These scrapers divide the annular space between the rotor and the housing into individual sections which communicate through constrictions formed in the region of the scrapers. The friction of the metal scrapers on the interior metal does not only free the chocolate from the inside of the housing wall but, additionally, provides a miniaturizing effect which assists the tempering or temperature control process. There is an extensive mechanical miniaturization of the crystals as a result of the friction of the scrapers on the housing wall, in addition to the miniaturizing effect already thermally achieved by the temperature effect.

This method of treating chocolate in every instance requires conveyor means in order to bring the chocolate into the temperature-control apparatus and to remove it therefrom after the treatment.

A temperature-control device in which the chocolate is moved continuously through the housing by means of a screw during the temperature control operation is also presently known. Through this solution, however, it is impossible to prevent a layer from adhering to the inside of the housing. The disadvantages of this layer have been described hereinabove. Although an attempt can be made to maintain the radial clearance between the screw and the housing small and to thus promote the formation of only a thin layer, neither the radial clearance nor the formation of the layer can be completely avoided.

SUMMARY OF THE INVENTION

Accordingly, it is an object of the present invention to provide a temperature-control apparatus which eliminates the drawbacks of the known prior art apparatus. On the basis of the pure temperature control process first mentioned above, such an apparatus would have to be so designed as to convey the chocolate along during the temperature-control process. Predicated on the screw conveyors with temperature control, the object of the invention would be to devise apparatus which conveys the chocolate in such a manner that temperature control is effectuated without a layer of chocolate forming on the inside of the housing.

In order to solve this problem, the invention is predicated upon an apparatus for the temperature control of flowable chocolate, such apparatus comprising a rotor rotating in a temperature-controlled housing and having means which bear resiliently against the housing and which wipe the chocolate away from the housing during rotation of the rotor.

According to the invention, this problem is primarily solved in that the wipers form consecutive chambers in the direction of rotation of the rotor, the chambers being separate from one another and being filled with chocolate, the rotationally symmetrical rotor being mounted in the housing so that its axis extends parallel thereto but so as to be eccentric in relation to the housing, and the housing has an inlet at one end in the region of the maximum distance between the rotor and the housing, while it has an outlet for the chocolate at its other end in the region of the minimum distance between the rotor and the housing.

Such a solution thus reliably prevents a layer of chocolate from forming on the inside of the rotor housing and insulating the rest of the chocolate from the temperature-controlled housing wall, which would result in a higher energy consumption and uneven temperature control. At the same time, the varying volume of different and separate chambers gives a conveying effect. The supply and discharge for the chocolate at the two rotor and housing ends may preferably be continually open although they may open and close intermittently, assuming that there are appropriate intervals therebetween.

BRIEF DESCRIPTION OF THE DRAWINGS

An exemplary embodiment of the invention is now described and illustrated diagrammatically in the drawings, in which.

DETAILED DESCRIPTION

Figure 1:
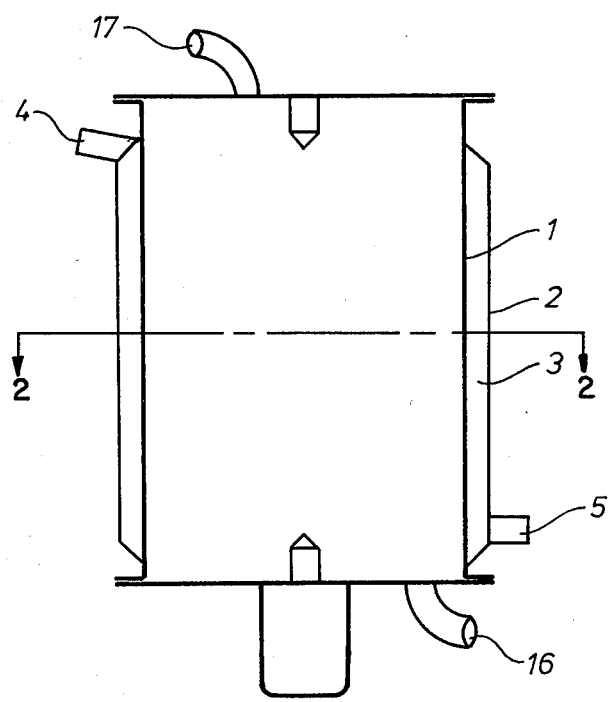
FIG. 1 is a longitudinal section of the inventive apparatus.
Figure 2:
FIG. 2 is an enlarged cross-section therethrough along line 2—2 showing the essential structural parts of the invention.

A cylindrical annular chamber 3 filled with cooling medium is provided between the rotor housing 1 and a housing jacket 2. The cooling medium reaches the annular chamber 3 through an inlet 4 provided at the top end of the housing. A hot-water outlet 5 is situated at the bottom end of the housing and is located opposite the inlet 4. Along the flow path between the inlet 4 and the outlet 5 the medium cools the rotor housing wall which, in turn, assumes its interior temperature from the chocolate, the temperature of which is to be controlled within the rotor housing. The rotor 8 is disposed in the housing 1 so as to be axially parallel thereto but with its longitudinal axis 6 being radially offset from the longitudinal axis 7 of the housing. The direction of rotation of the rotor is shown by arrow 9. A plurality of longitudinal slots 10 extending in parallel relationship to the longitudinal axis of the rotor are provided therein, being distributed at regular intervals over the periphery thereof. The leading edges 11 of the slots 10, as viewed in the direction of rotation, are located more tangentially in relation to the rotor while the trailing edges 12, as viewed in the direction of rotation, are located more radially. A wiper 13, preferably constituted of brass, is mounted in each slot 10. The bottom end of each wiper is rounded off so that it can freely pivot in the circumferential direction of the rotor. In the opposite direction relative to the direction of rotation, each wiper 13 is held by springs 14 with the outer knife-edge end bearing against the inside of the rotor housing. The springs bear against the inner end of a bore 15 in the rotor, at one end thereof, while the other end bears against the wipers. The wiper knife-edges are so constructed that only the backs of the wipers taper in a knife-edge manner towards the fronts, thus relieving the wiper edges from contact pressure at the interior of the housing.

The eccentricity between the rotor and the housing is denoted by E. The suction inlet 16 for the supply of the chocolate is provided at the bottom end of the housing on the side where there is the maximum distance e between the rotor and the housing, while the delivery outlet 17 is disposed at the top end of the housing on the side where there is the minimum distance $e_1$ between the rotor and the housing. The rotor is supported at its top and bottom ends within the housing while the drive is introduced at the bottom end.

What is claimed is:

1. An arrangement for treating chocolate material comprising, a cylindrical container for axially conveying the chocolate material therethrough, a rotationally symmetrical cylindrical rotor mounted in said container with its axis extending parallel to the longitudinal axis of the container but mounted eccentrically relative thereto, said rotor including obliquely, outwardly-directed slots along its periphery extending substantially along its entire length, with bar wiper members arranged in said slots and extending along substantially the entire length thereof, said bar wiper members having sharpened outer edges, means for supporting said bar wiper members with their sharpened outer edges forcibly bearing against the inner wall of the cylindrical container including springs arranged between the bar wiper members and the slots in the rotor, and said cylindrical container having an inlet for chocolate material at one end in the region of the maximum distance between the rotor and the cylindrical container, and an outlet for chocolate material at its other end in the region of the mimimum distance between the rotor and the cylindrical container.

2. An arrangement as claimed in claim 1, said slots in the periphery of the rotor being substantially radial slots and the wiper members being mounted therein so as to be pivotable in the circumferential direction thereof; and said springs biasing said wiper members in the circumferential direction.

3. An arrangement as claimed in claim 1, the leading edges of said slots as viewed in the direction of rotationof the rotor being disposed generally tangential while the trailing edges being disposed generally axially.

4. An arrangement as claimed in claims 1, 2 or 3, the inner edges of the wiper member being rounded.

5. An arrangement as claimed in claims 1, 2, 3 or 4, the outer edges of the wiper members being sharpened to knife edges.

6. An arrangement as claimed in claim 5, the sharpening being produced solely by bevelling the back of the wiper means.

* * * * *